(12) United States Patent
Zhang et al.

(10) Patent No.: US 9,690,536 B2
(45) Date of Patent: Jun. 27, 2017

(54) TERMINAL DEVICE, AND SCREEN-SHARING DISPLAY METHOD AND SYSTEM

(71) Applicant: Huawei Device Co., Ltd., Shenzhen (CN)

(72) Inventors: Qinliang Zhang, Shenzhen (CN); Yu Zhu, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 149 days.

(21) Appl. No.: 14/643,664

(22) Filed: Mar. 10, 2015

(65) Prior Publication Data

US 2015/0186101 A1   Jul. 2, 2015

Related U.S. Application Data

(63) Continuation of application No. PCT/CN2013/083216, filed on Sep. 10, 2013.

(30) Foreign Application Priority Data

Sep. 10, 2012   (CN) .......................... 2012 1 0331418

(51) Int. Cl.
G06F 3/14 (2006.01)
G06F 3/0488 (2013.01)
G06F 3/041 (2006.01)
G06F 3/0481 (2013.01)
(Continued)

(52) U.S. Cl.
CPC ............ *G06F 3/1454* (2013.01); *G06F 3/041* (2013.01); *G06F 3/0488* (2013.01); *G06F 3/04817* (2013.01); *G06T 11/60* (2013.01); *H04M 1/7253* (2013.01); *G09G 2354/00* (2013.01);
(Continued)

(58) Field of Classification Search
CPC combination set(s) only.
See application file for complete search history.

(56) References Cited

U.S. PATENT DOCUMENTS 7,653,883 B2   1/2010 Hotelling et al.
2003/0025678 A1   2/2003 Lee et al.
(Continued)

FOREIGN PATENT DOCUMENTS

CN   1198204 C   4/2005
CN   101882056 A   11/2010
(Continued)

*Primary Examiner* — Van Chow
(74) *Attorney, Agent, or Firm* — Slater Matsil, LLP

(57) ABSTRACT

Embodiments of the present invention disclose a terminal device, and a screen-sharing display method and system. The screen-sharing display method is used in a device having a touch function, where the method includes: detecting a position of a touch object on a touchscreen; generating, according to the detected position of the touch object on the touchscreen, an icon corresponding to the position of the touch object; superimposing the icon onto display content of the touchscreen to obtain screen-sharing touch and display content; and sending the screen-sharing touch and display content to a screen-sharing display device, so that the screen-sharing display device displays the screen-sharing touch and display content including the icon.

18 Claims, 8 Drawing Sheets

(51) Int. Cl.
*G06T 11/60* (2006.01)
*H04M 1/725* (2006.01)
(52) U.S. Cl.
CPC ... *G09G 2360/121* (2013.01); *H04M 2250/22* (2013.01)

(56) References Cited

U.S. PATENT DOCUMENTS

| | | | | |
|---|---|---|---|---|
| 2010/0156807 A1* | 6/2010 | Stallings | ............ | G06F 3/04886 345/173 |
| 2011/0181520 A1* | 7/2011 | Boda | ..................... | G06F 1/1645 345/173 |
| 2012/0084704 A1* | 4/2012 | Lee | ......................... | G06F 3/017 715/776 |
| 2013/0076793 A1* | 3/2013 | Sirpal | ................... | G06F 3/1438 345/649 |
| 2015/0007066 A1* | 1/2015 | Joo | ...................... | G06F 3/0481 715/761 |
| 2015/0180916 A1* | 6/2015 | Ahn | ................... | G06F 3/04845 715/273 |

FOREIGN PATENT DOCUMENTS

| | | |
|---|---|---|
| CN | 102355558 A | 2/2012 |
| EP | 1990707 A1 | 11/2008 |
| KR | 100980741 B1 | 9/2010 |
| KR | 101151549 B1 | 5/2012 |

\* cited by examiner

TERMINAL DEVICE, AND SCREEN-SHARING DISPLAY METHOD AND SYSTEM

This application is a continuation of International Application No. PCT/CN2013/083216, filed on Sep. 10, 2013, which claims priority to Chinese Patent Application No. 201210331418.1, filed on Sep. 10, 2012, both of which are hereby incorporated by reference in their entireties.

TECHNICAL FIELD

The present invention relates to the data processing field, and in particular, to a terminal device, and a screen-sharing display method and system.

BACKGROUND

Currently, functions of a terminal device such as a smartphone or a tablet computer become stronger. A user may use a terminal device such as a smartphone or a tablet computer to watch a video, view a photo, browse a web page, and so on. However, screens of such mobile intelligent terminals are relatively small. In order to obtain better visual experience, generally, display content of these intelligent terminals may be synchronized and output to devices with larger screens, for example, to be synchronized to devices that have larger display screens, such as a projector and a large-screen television. In this way, display content on a small screen of an intelligent terminal may be viewed from a large-screen device. This technology is generally called a screen-sharing technology.

After the screen-sharing technology is used, same content is displayed on two screens; for example, screen sharing is implemented between a smartphone having a touchscreen and a television. When the smartphone is operated in a touch manner, a user performing a touch operation generally can only perform observation by using the touchscreen of the smartphone, and actually cannot experience an effect brought by large-screen display using the screen-sharing technology, which affects user experience.

SUMMARY

Embodiments of the present invention provide a terminal device, and a screen-sharing display method and system. Touch operation conditions may be synchronized into a screen-sharing display device, so that a touch operator may perform a touch operation by observing the screen-sharing display device, thereby improving user experience.

According to one aspect, an embodiment of the present invention provides a screen-sharing display system. The system includes a device having a touch function and a screen-sharing display device. The device has a touch function is configured to detect a position of a touch object on a touchscreen, to generate, according to the detected position of the touch object on the touchscreen, an icon corresponding to the position of the touch object, to superimpose the icon onto display content of the touchscreen to obtain screen-sharing touch and display content, and to send the screen-sharing touch and display content to the screen-sharing display device. The screen-sharing display device is connected to the device having a touch function and is configured to receive the screen-sharing touch and display content sent by the device having a touch function, and to locally display the screen-sharing touch and display content including the icon.

The device having a touch function may further be configured to discover the screen-sharing display device in a communication network, and start, after entering a screen-sharing mode, an adjacent touch module to detect a position of a touch object on the touchscreen.

According to another aspect, an embodiment of the present invention further provides a terminal device, including a touchscreen, where the terminal device further includes: an adjacent touch module, configured to detect a position of a touch object on the touchscreen; a position icon generating module, connected to the adjacent touch module, and configured to obtain the position, which is detected by the adjacent touch module, of the touch object on the touchscreen, and generate, according to the detected position of the touch object on the touchscreen, an icon corresponding to the position of the touch object; a combining module, connected to the position icon generating module, and configured to obtain the icon that is generated by the position icon generating module and corresponds to the position of the touch object, and superimpose the icon onto display content of the touchscreen to obtain screen-sharing touch and display content; and a sending module, connected to the combining module, configured to send the screen-sharing touch and display content to a screen-sharing display device, so that the screen-sharing display device displays the screen-sharing touch and display content including the icon.

The combining module may include a display cache module, connected to the position icon generating module, and configured to obtain the icon that is generated by the position icon generating module and corresponds to the position of the touch object, superimpose the icon onto the display content of the touchscreen to obtain the screen-sharing touch and display content, and update, according to the screen-sharing touch and display content, screen-sharing touch and display content of the touchscreen; and a screen-sharing module, connected to the display cache module, and configured to obtain the screen-sharing touch and display content, and send the screen-sharing touch and display content to the sending module.

Alternatively, the combining module includes: a screen-sharing module, connected to the position icon generating module, and configured to obtain the icon that is generated by the position icon generating module and corresponds to the position of the touch object, superimpose the icon onto the display content of the touchscreen to obtain the screen-sharing touch and display content, and send the screen-sharing touch and display content to the sending module; and a display cache module, connected to the screen-sharing module, and configured to obtain the screen-sharing touch and display content, and update, according to the screen-sharing touch and display content, screen-sharing touch and display content of the touchscreen.

Further, the terminal device may further include a screen-sharing startup module, which is configured to discover a screen-sharing display device in a communication network, and start, after entering a screen-sharing mode, the adjacent touch module to detect a position of a touch object on the touchscreen.

According to another aspect, an embodiment of the present invention further provides a screen-sharing display method, which is used in a device having a touch function, where the method includes: detecting a position of a touch object on a touchscreen; generating, according to the detected position of the touch object on the touchscreen, an icon corresponding to the position of the touch object; superimposing the icon onto display content of the touchscreen to obtain screen-sharing touch and display content;

and sending the screen-sharing touch and display content to a screen-sharing display device, so that the screen-sharing display device displays the screen-sharing touch and display content including the icon.

When the touch object is not in contact with the touchscreen, the position of the touch object on the touchscreen may be a projection position of the touch object on the touchscreen; or when the touch object is in contact with the touchscreen, the position of the touch object on the touchscreen may be a contact position of the touch object on the touchscreen.

After the superimposing the icon onto display content of the touchscreen to obtain screen-sharing touch and display content, the method further includes: updating, according to the screen-sharing touch and display content, screen-sharing touch and display content of the touchscreen.

Specifically, a step of the detecting a position of a touch object on a touchscreen may include: starting the device having a touch function to enter a screen-sharing mode, and starting, after the device having a touch function enters the screen-sharing mode, detecting the position of the touch object on the touchscreen.

In embodiments of the present invention, when a device with a touchscreen performs screen-sharing display with a screen-sharing display device, an icon of a position of a touch object on the touchscreen is superimposed onto original display content and then transmitted to the screen-sharing display device for display; touch operation conditions may be synchronized into the screen-sharing display device, so that an operator of the touch object may perform a touch operation only by observing display content of the screen-sharing display device without a need to observe the touchscreen while observing the screen-sharing display device, thereby preventing a user from performing switching back and forth between the two screens for viewing, and improving user experience.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In an existing screen-sharing technology, if one of display screens is a touchscreen, when a user performs control by means of a touch operation, the operation of the user performed on the touchscreen cannot be observed on another screen-sharing display device, so that the user can perform a touch operation only by observing the touchscreen, and the touchscreen also needs to remain in a display state. However, in many environments in which the screen-sharing technology is used, a display screen of another screen-sharing display device is generally larger, which is more beneficial for the user to perform a touch operation, and other observers also hope to view each touch operation performed by the user on the larger display screen. Therefore, a screen-sharing display solution is proposed in an embodiment of the present invention. Display is performed by capturing position information of the user on the touchscreen; not only content may be displayed in a screen sharing manner, but also a touch operation may be displayed on the displayed content in a screen sharing manner.

Figure 1:
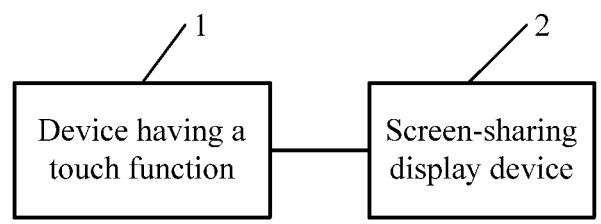
FIG. 1 is a schematic diagram of specific composition of a screen-sharing display system according to an embodiment of the present invention.

FIG. 1 shows a screen-sharing display system according to an embodiment of the present invention. The system includes a device having a touch function and a screen-sharing display device. It should be noted that, there may be one or more screen-sharing display devices in the system; communication between the device having a touch function and the screen-sharing display device may be wired communication, and may also be wireless communication, which is not limited herein.

A device 1 having a touch function is configured to detect a position of a touch object on a touchscreen of the device 1, generate, according to the detected position of the touch object on the touchscreen, an icon corresponding to the position of the touch object, superimpose the icon onto display content of the touchscreen to obtain screen-sharing touch and display content, and send the screen-sharing touch and display content to a screen-sharing display device. Further, the device 1 having a touch function is configured to discover the screen-sharing display device in a communication network, and further start, after entering a screen-sharing mode, an adjacent touch module to detect a position of a touch object on the touchscreen.

A screen-sharing display device 2, connected to the device 1 having a touch function, is configured to receive the screen-sharing touch and display content sent by the device 1 having a touch function, and locally display the screen-sharing touch and display content including the icon.

Figure 2:
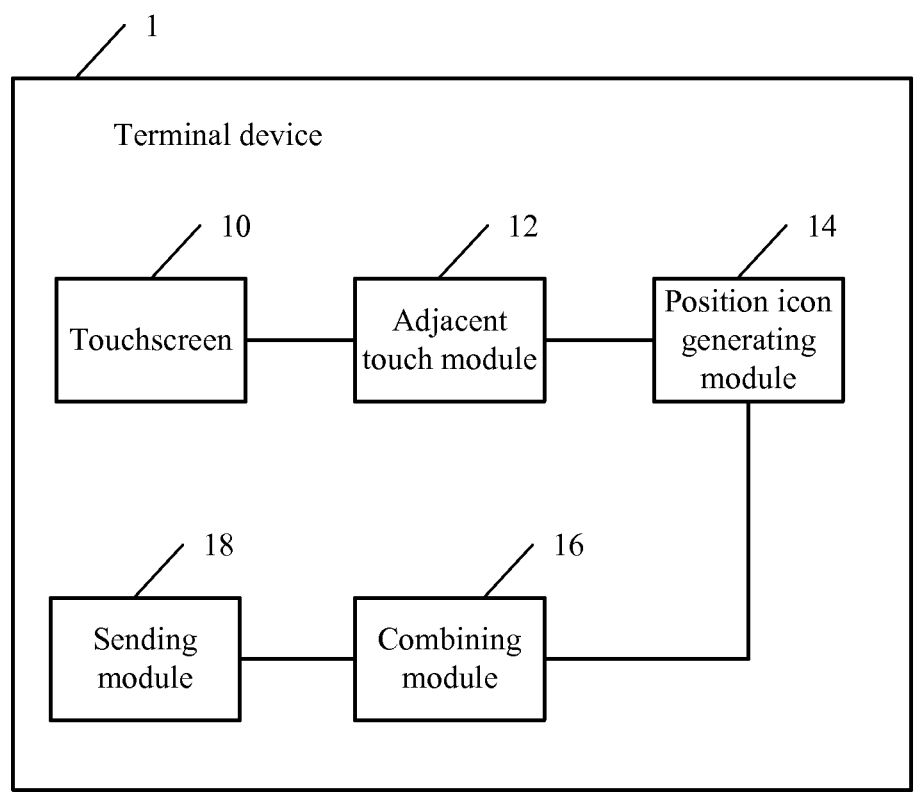
FIG. 2 is a schematic diagram of specific composition of a device having a touch function according to an embodiment of the present invention.

FIG. 2 shows specific composition of a device having a touch function according to an embodiment of the present invention. In this embodiment, the device having a touch function is called a terminal device, and the terminal device includes a touchscreen 10, and further includes an adjacent touch module 12, a position icon generating module 14, a combining module 16, and a sending module 18.

The adjacent touch module 12 is configured to detect a position of a touch object on the touchscreen 10. The touch object may be an object that can perform a touch operation on the touchscreen, such as a finger of a controller or a touch pen (or called a stylus). The touch object may be in contact with the touchscreen, or may not be in contact with the touchscreen.

The position icon generating module 14, connected to the adjacent touch module 12, is configured to obtain the position, which is detected by the adjacent touch module 12, of the touch object on the touchscreen 10, and generate, according to the detected position of the touch object on the touchscreen 10, an icon corresponding to the position of the touch object.

When the touch object is not in contact with the touchscreen, the position of the touch object on the touchscreen is a projection position of the touch object on the touchscreen; when the touch object is in contact with the touchscreen, the position of the touch object on the touchscreen is a contact position of the touch object on the touchscreen.

The icon may record a current position, and may also include a historical position, a current position, and the like, which may be specifically relevant to an application program displayed on a current screen. For example, in a drawing program, a finger corresponds to a "Z" shape is paddled by a painting brush function, and an icon is a "Z" shape icon at a corresponding position; in an operating system, a finger corresponds to a mouse function, and an icon is a mouse icon at a corresponding position; in a word document application, a finger corresponds to a cursor in a word document, an icon is a cursor icon at a corresponding position. As a specific application varies, specific content of the icon may be in another form, which is not limited in the present invention, and details are not described herein again.

The combining module 16, connected to the position icon generating module 14, is configured to obtain the icon that is generated by the position icon generating module 14 and corresponds to the position of the touch object, and superimpose the icon onto display content of the touchscreen to obtain screen-sharing touch and display content.

The sending module 18, connected to the combining module 16, is configured to send the screen-sharing touch and display content to the screen-sharing display device 2, so that the screen-sharing display device 2 displays the screen-sharing touch and display content including the icon.

Figure 3:
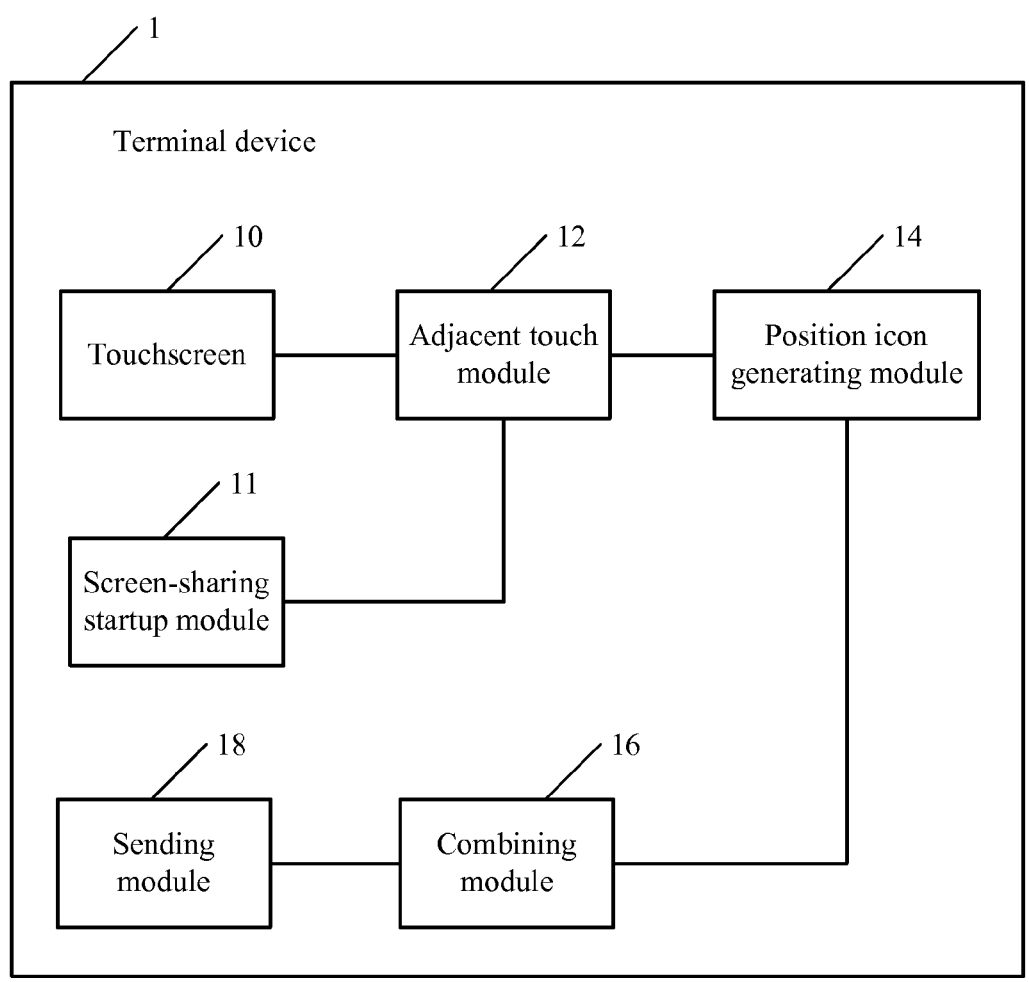
FIG. 3 is another schematic diagram of specific composition of a device having a touch function according to an embodiment of the present invention.

As shown in FIG. 3, the terminal device 1 may further include a screen-sharing startup module 11, which is configured to discover a screen-sharing display device in a communication network, and start, after entering a screen-sharing mode, the adjacent touch module to detect a position of a touch object on the touchscreen.

Figure 4:
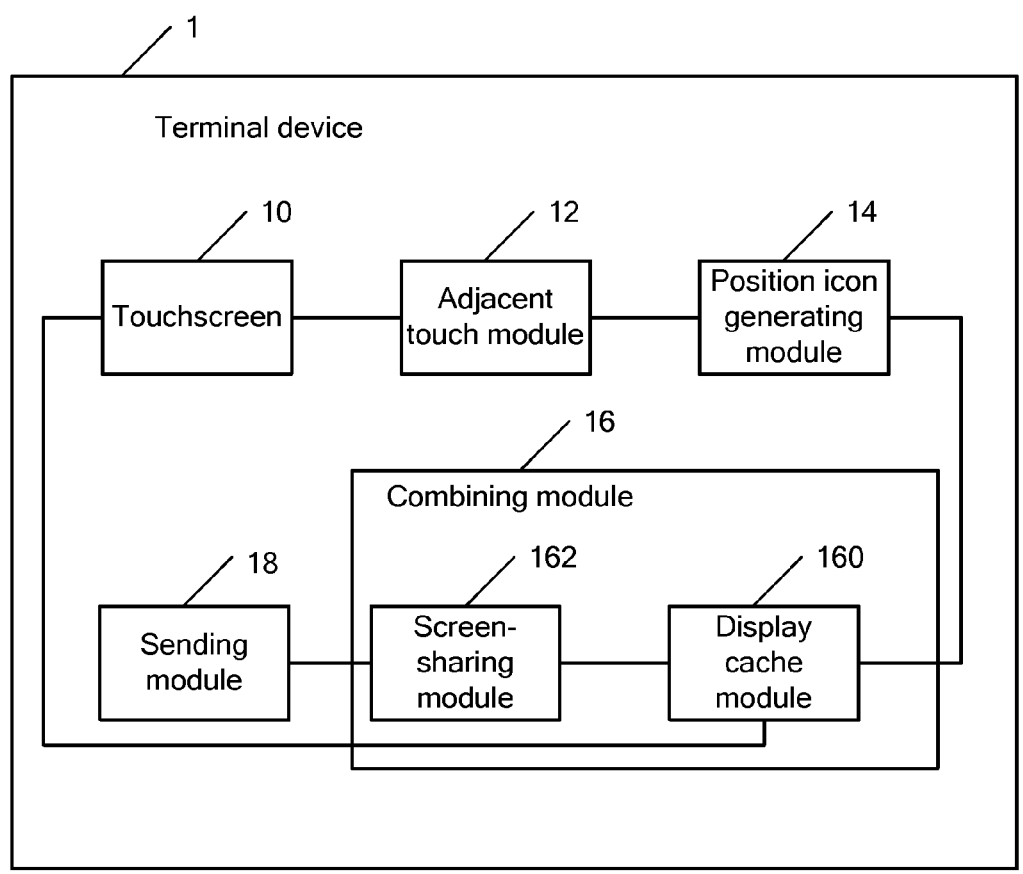
FIG. 4 is a schematic diagram of specific composition of a device having a touch function when a combining module in FIG. 2 includes a display cache module and a screen-sharing module.

As shown in FIG. 4, the combining module 16 may include: a display cache module 160, connected to the position icon generating module, and configured to obtain the icon that is generated by the position icon generating module and corresponds to the position of the touch object, superimpose the icon onto the display content of the touchscreen to obtain the screen-sharing touch and display content, and update, according to the screen-sharing touch and display content, screen-sharing touch and display content of the touchscreen; and a screen-sharing module 162, connected to the display cache module, and configured to obtain the screen-sharing touch and display content, and send the screen-sharing touch and display content to the sending module.

Figure 5:
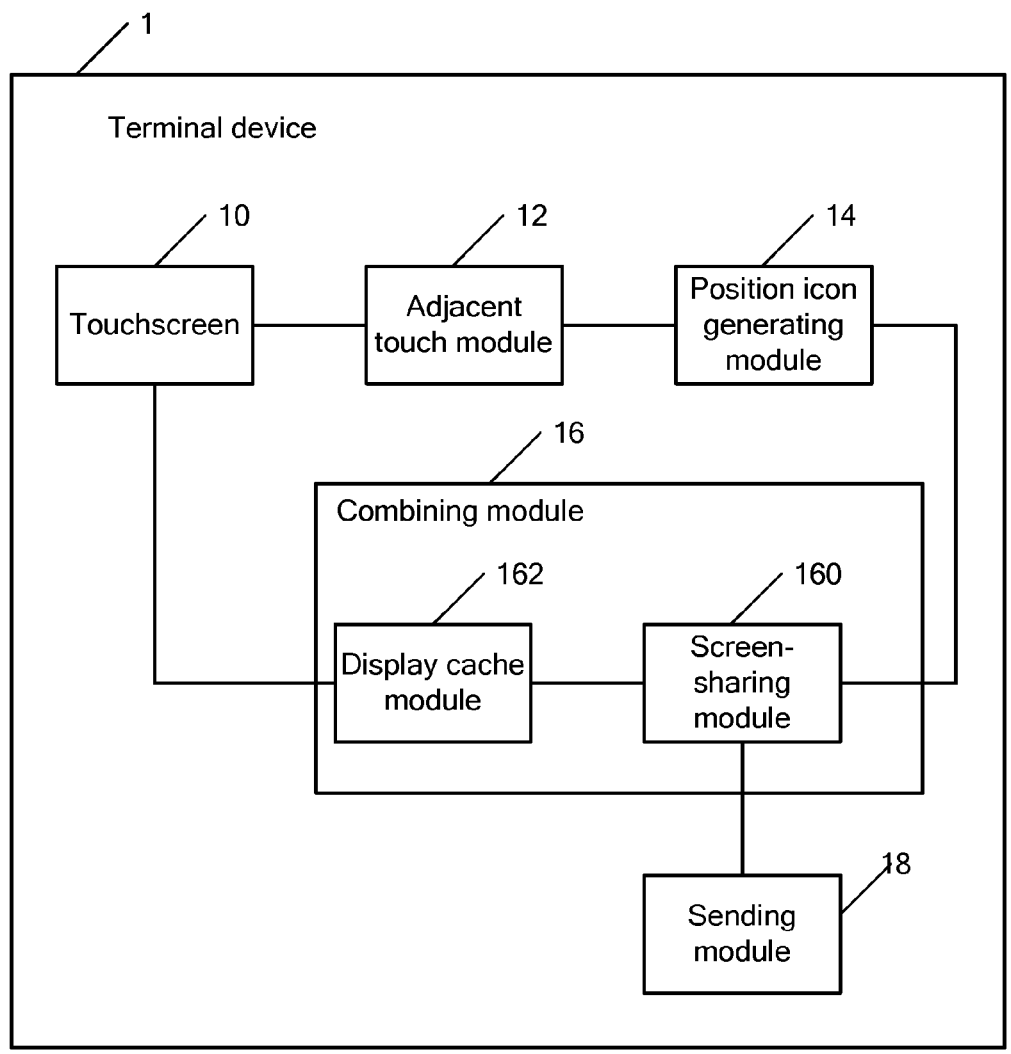
FIG. 5 is another schematic diagram of specific composition of a device having a touch function when a combining module in FIG. 2 includes a display cache module and a screen-sharing module.

Alternatively, as shown in FIG. 5, the combining module 16 may include: a screen-sharing module 160, connected to the position icon generating module, and configured to obtain the icon that is generated by the position icon generating module and corresponds to the position of the touch object, superimpose the icon onto the display content of the touchscreen to obtain the screen-sharing touch and display content, and send the screen-sharing touch and display content to the sending module; and a display cache module 162, connected to the screen-sharing module, and configured to obtain the screen-sharing touch and display content, and update, according to the screen-sharing touch and display content, screen-sharing touch and display content of the touchscreen.

Figure 6:
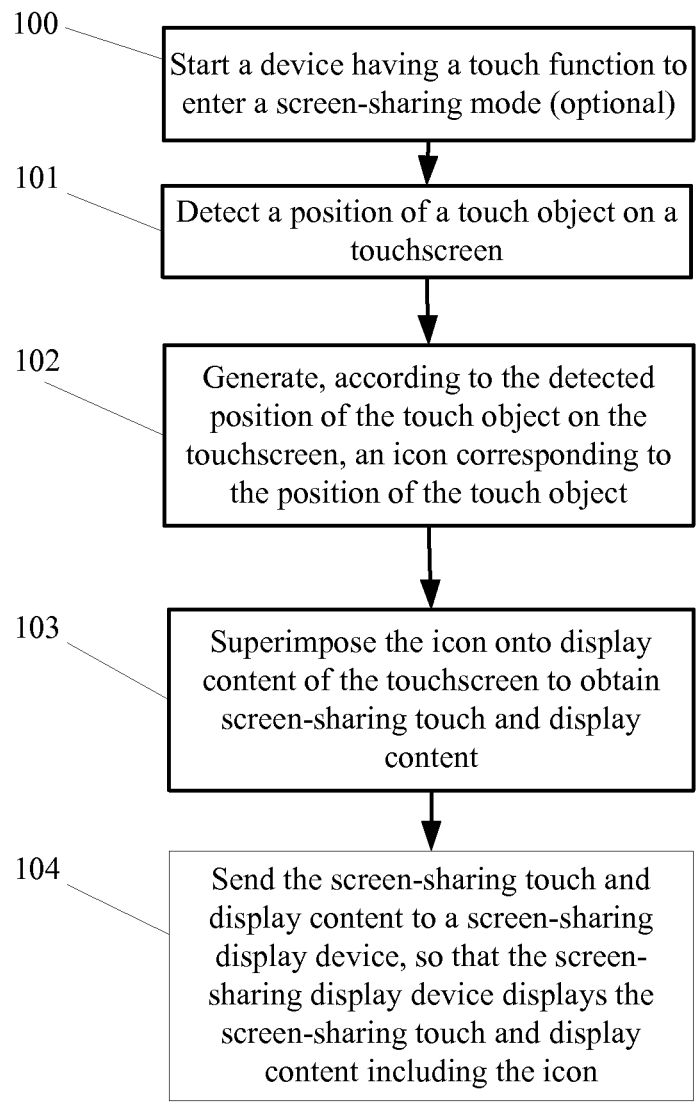
FIG. 6 is a specific schematic flowchart of a screen-sharing display method according to an embodiment of the present invention.

Correspondingly, as shown in FIG. 6, an embodiment of the present invention further provides a screen-sharing display method, which is used in a device having a touch function, where the method includes the following steps.

101. Detect a position of a touch object on a touchscreen. Before this step, the method may further include. 100. Start the device having a touch function to enter a screen-sharing mode, and then start the step of detecting a position of a touch object on a touchscreen.

That is, the device having a touch function initially needs to be started to discover a screen-sharing display device in a network, enter the screen-sharing mode, and then start a detection process. Definitely, if the device having a touch function has entered the screen-sharing mode, step 100 may be skipped; a position of a touch object is detected in real time or at regular time, and as long as the touch object moves, a new position of the touch object after the touch object moves is detected.

102. Generate, according to the detected position of the touch object on the touchscreen, an icon corresponding to the position of the touch object. A definition of the icon in this embodiment is consistent with that in the foregoing apparatus embodiment, and details are not described herein again.

In addition, when the touch object is not in contact with the touchscreen, the position of the touch object on the touchscreen is a projection position of the touch object on the touchscreen; or when the touch object is in contact with the touchscreen, the position of the touch object on the touchscreen is a contact position of the touch object on the touchscreen.

103. Superimpose the icon onto display content of the touchscreen to obtain screen-sharing touch and display content. After this step, the method may further include A: Update, according to the screen-sharing touch and display content, screen-sharing touch and display content of the touchscreen. There is no necessary sequence between step A and a subsequent step 104.

104. Send the screen-sharing touch and display content to a screen-sharing display device, so that the screen-sharing display device displays the display content including the icon. It should be noted that, the screen-sharing touch and display content includes a position of the icon in the display content.

It can be learnt from the description of the foregoing embodiment that, when a device with a touchscreen performs screen-sharing display with a screen-sharing display device, position information of a touch object on the touchscreen is superimposed onto original display content and then transmitted to the screen-sharing display device for display; touch operation conditions may be synchronized into the screen-sharing display device, so that an operator of the touch object may perform a touch operation only by observing display content of the screen-sharing display device without a need to observe the touchscreen while observing the screen-sharing display device, thereby preventing a user from performing switching back and forth between the two screens for viewing, and improving user experience.

Figure 7:
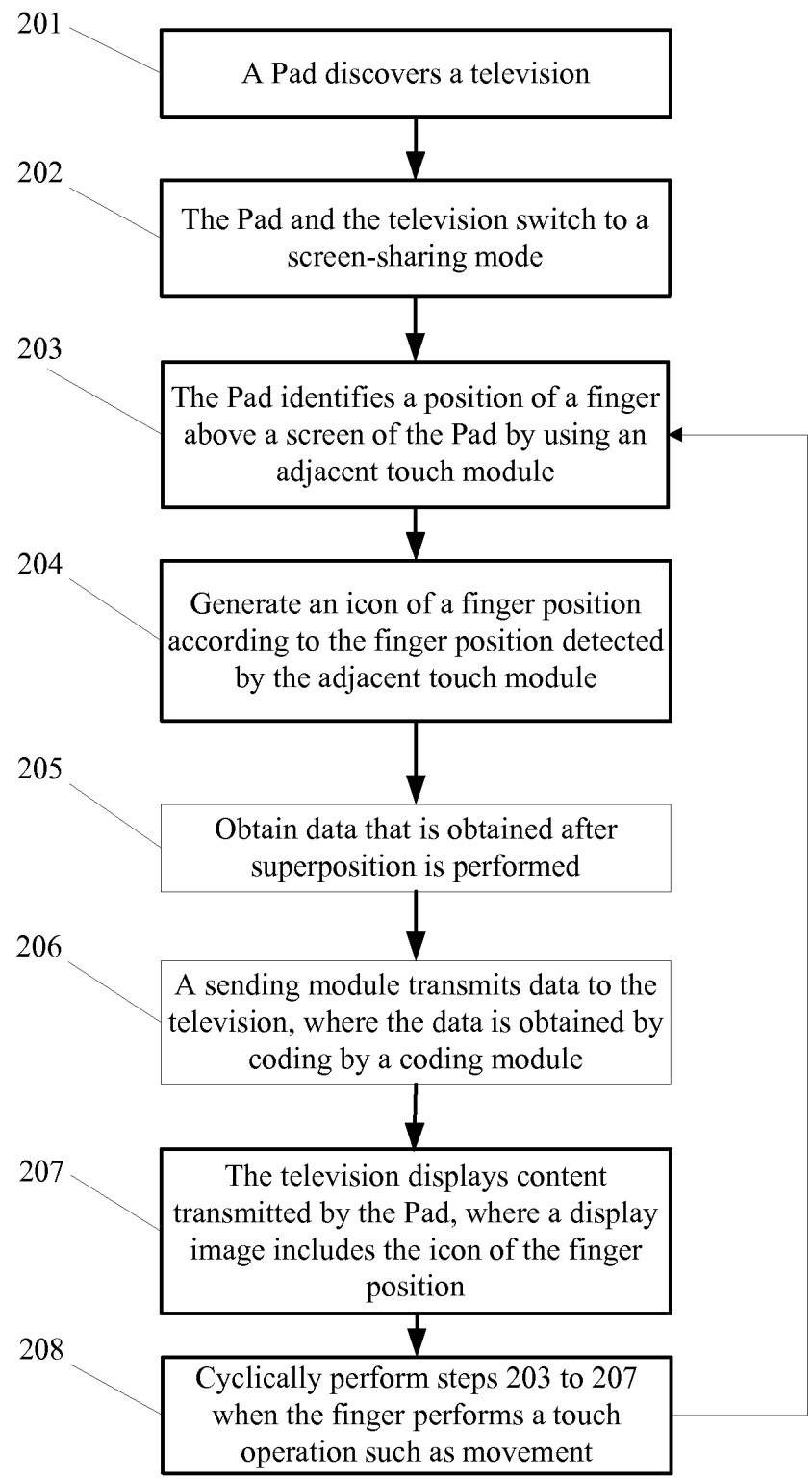
FIG. 7 is another specific schematic flowchart of a screen-sharing display method according to an embodiment of the present invention.
Figure 8:
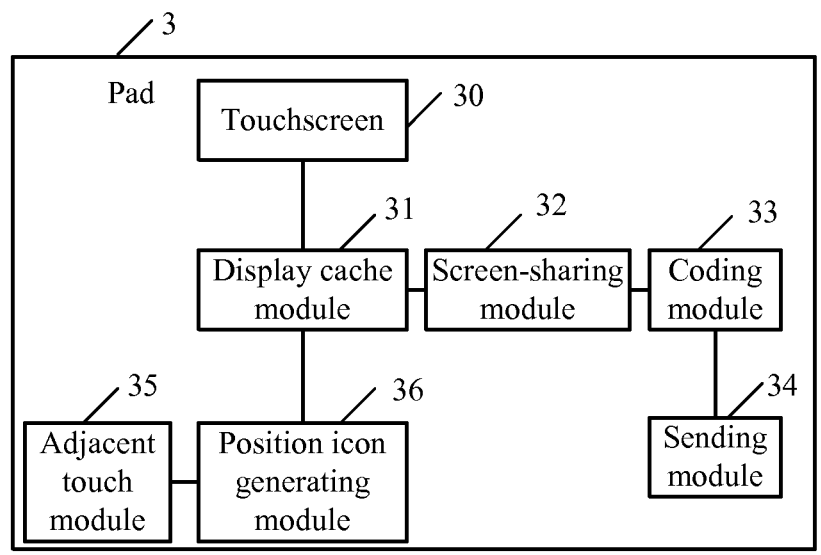
FIG. 8 is a schematic diagram of specific composition of a Pad according to an embodiment of the present invention.

FIG. 7 shows another specific schematic flowchart of a screen-sharing display method according to an embodiment of the present invention. In this embodiment, a device having a touch function is a tablet computer (hereinafter referred to as a Pad) with a touchscreen, and a screen-sharing display device is a television. Composition modules of the Pad in this embodiment are shown in FIG. 8, and the Pad 3 includes a touchscreen 30, a display cache module 31, a screen-sharing module 32, a coding module 33, a sending module 34, an adjacent touch module 35, and a position icon generating module 36. For specific functions of each module, reference may be made to the foregoing description in FIG. 2 to FIG. 5, and description of the following method. The method includes the following steps:

201. A Pad discovers a television. For example, the Pad may discover a television in a network by using a discovery function of the Universal Plug and Play (Universal Plug and Play, UPnP) protocol, the Pad has a control point function, and the television has a UPnP device function.

202. The Pad and the television switch to a screen-sharing mode. After the Pad discovers the television that may perform screen-sharing display in the network, the television may be displayed on a display interface of the Pad, and a user may select the discovered television on which screen sharing is to be performed; definitely, by means of a configuration, it may also be that the Pad automatically selects a default television. After the television on which screen sharing is to be performed is determined, the Pad and the selected television switch to the screen-sharing mode. In this case, a state of the television is displaying content of the Pad, and a state of the Pad is: screen display is disabled (optional), the touchscreen 30 of the Pad is still working, and an adjacent touch function is started.

203. The Pad identifies a position of a finger above a screen of the Pad by using the adjacent touch module 35.

Figure 9:
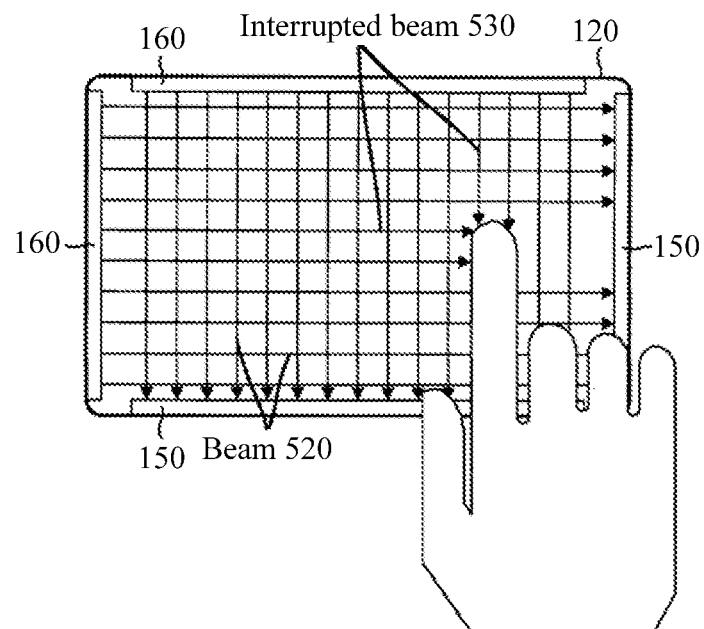
FIG. 9 is a schematic diagram of a finger detection principle of a touchscreen according to an embodiment of the present invention.

The adjacent touch module 35 may detect the position of the finger above the screen of the Pad (the finger is not in contact with the screen). A technology for detecting the position of the finger is not limited in this embodiment of the present invention, and a detection method in the prior art may be used to detect the position of the finger above the screen. FIG. 9 shows a schematic diagram of an existing detection solution. In the figure, 160 indicates a light emitting module, 150 indicates a light detection module, and 120 indicates a screen. The light emitting module 160 emits beams 520 in x-axis and y-axis directions. When a finger is close to the screen 120, a beam (for example, an interrupted beam 530) emitted by the light emitting module 160 is interrupted, the light detection module 150 detects changes of the beams in the x-axis and y-axis directions, and a position of the finger may be calculated according to these light changes.

204. The position icon generating module 36 generates an icon of a finger position according to the finger position detected by the adjacent touch module 35.

205. Obtain data that is obtained after superposition is performed.

For example, the display cache module 31 superimposes the icon of the finger position onto original display content of the Pad, and refreshes data in a display cache according to the data that is obtained after superposition is performed. In this case, the display cache includes original display data and icon data of the finger position; optionally, if a display screen of the Pad is turned on, the icon of the finger position is added on the display screen of the Pad. The screen-sharing module 32 reads data from the display cache, and performs coding by using the coding module 33; for example, the data is coded to data in an H.264 format.

Figure 10:
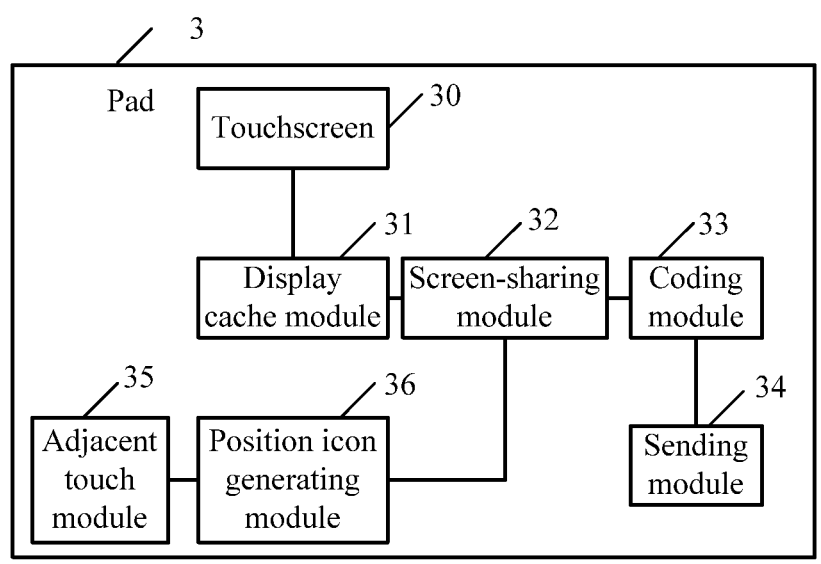
FIG. 10 is another schematic diagram of specific composition of a Pad according to an embodiment of the present invention.

Definitely, in this step, a superimposition function may also be completed by the screen-sharing module 32. That is, the screen-sharing module 32 superimposes the icon of the finger position onto the display cache of the Pad to generate data to be sent to the television; if the display screen of the Pad is turned on, the screen-sharing module 32 may further transmit the data that is obtained after superposition is performed to the display cache, and the data in the display cache is refreshed according to the data that is obtained after superposition is performed, where the icon of the finger position is added to content displayed on the display screen of the Pad. In this case, composition of the Pad is shown in FIG. 10.

206. The sending module 34 transmits data to the television, where the data is obtained by coding by the coding module 33.

207. The television displays content transmitted by the Pad, where a display image includes the icon of the finger position.

In this way, the user may determine the position of the finger above the screen of the Pad according to the icon, which is displayed on the television, of the finger position, so as to perform a touch action.

208. Cyclically perform steps 203 to 207 when the finger performs a touch operation such as movement. The Pad performs a corresponding operation and interface update according to the touch operation, and synchronizes an updated interface into the television.

In an embodiment of the present invention, a computer storage medium is further included. The computer storage medium stores a computer executable program, the computer executable program may implement steps in the foregoing method, including: detecting a position of a touch object on a touchscreen; generating, according to the detected position of the touch object on the touchscreen, an icon corresponding to the position of the touch object; superimposing the icon onto display content of the touchscreen to obtain screen-sharing touch and display content; and sending the screen-sharing touch and display content to a screen-sharing display device, so that the screen-sharing display device displays the screen-sharing touch and display content including the icon.

In an embodiment of the present invention, a terminal device is further included, including a touchscreen, a memory, a processor, and a communication module. The processor is configured to detect a position of a touch object on a touchscreen, generate, according to the detected position of the touch object on the touchscreen, an icon corresponding to the position of the touch object, and superimpose the icon onto display content of the touchscreen to obtain screen-sharing touch and display content; the communication module is configured to send the screen-sharing touch and display content obtained by the processor to a screen-sharing display device, so that the screen-sharing display device displays the screen-sharing touch and display content including the icon; and the memory is configured to store various pieces of intermediate data.

It can be learnt from the description of the foregoing embodiments that, in a screen-sharing application, a terminal device having a touch function identifies a position of a finger above a screen of the terminal device and sends the position of the finger to a television, and the position of the finger is displayed by the television in an icon manner, so that a user determines the position of the finger above the screen of the terminal device according to an icon, which is displayed on the television, of the finger position. In this way, when a user operates a device having a touchscreen, the user may only watch a television screen, and does not need to watch a screen of the terminal device; therefore, eyes of the user do not need to switch between the two screens, thereby improving user experience.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely exemplary embodiments of the present invention, and definitely is not intended to limit the protection scope of the present invention. Any equivalent modification made in accordance with the claims of the present invention shall fall within the scope of the present invention.

What is claimed is:

1. A terminal device, comprising:
    a touchscreen;
    an adjacent touch module configured to detect a position of a touch object that performs a touch operation on the touchscreen displaying display content;
    a processor; and
    a memory storing program modules executable by the processor, the modules including:
        a position icon generating module configured to obtain the position of the touch object detected by the adjacent touch module, and to generate, according to the detected position, an icon corresponding to the position of the touch object, wherein the icon comprises information about the detected position of the touch object and is used to display the touch operation at the detected position of the touchscreen;
        a combining module configured to obtain the icon that is generated by the position icon generating module and to superimpose the icon onto the display content of the touchscreen at the detected position to obtain screen-sharing touch and display content, the screen-sharing touch and display content comprising the display content of the touchscreen and the icon located at the detected position; and
        a sending module configured to send the screen-sharing touch and display content comprising the icon to a screen-sharing display device for display, wherein the icon allows the touch operation that is not observable on the screen-sharing display device to be displayed on the screen-sharing display device by displaying the icon.

2. The terminal device according to claim 1, wherein the combining module comprises:
    a display cache module configured to obtain the icon that is generated by the position icon generating module, to superimpose the icon onto the display content of the touchscreen to obtain the screen-sharing touch and display content, and to update, according to the screen-sharing touch and display content, screen-sharing touch and display content of the touchscreen; and
    a screen-sharing module configured to obtain the screen-sharing touch and display content, and to send the screen-sharing touch and display content to the sending module.

3. The terminal device according to claim 1, wherein the combining module comprises:
    a screen-sharing module configured to obtain the icon that is generated by the position icon generating module, to superimpose the icon onto the display content of the touchscreen to obtain the screen-sharing touch and display content, and to send the screen-sharing touch and display content to the sending module; and
    a display cache module configured to obtain the screen-sharing touch and display content, and to update, according to the screen-sharing touch and display content, screen-sharing touch and display content of the touchscreen.

4. The terminal device according to claim 1, wherein the modules further include a screen-sharing startup module, which is configured to discover a screen-sharing display device in a communication network, and to start the adjacent touch module to detect a position of a touch object on the touchscreen after entering a screen-sharing mode.

5. The terminal device according to claim 2, wherein the modules further include a screen-sharing startup module, which is configured to discover a screen-sharing display device in a communication network, and to start the adjacent touch module to detect a position of a touch object on the touchscreen after entering a screen-sharing mode.

6. The terminal device according to claim 3, wherein the modules further include a screen-sharing startup module, which is configured to discover a screen-sharing display device in a communication network, and to start the adjacent touch module to detect a position of a touch object on the touchscreen after entering a screen-sharing mode.

7. A screen-sharing display method, used in a device having a touch function, the method comprising:
    detecting a position of a touch object performing a touch operation at the position on a touchscreen displaying display content;
    generating an icon corresponding to the touch operation performed at the position of the touch object based on the detected position of the touch object on the touchscreen, the icon comprising information about the position and displaying the touch operation performed at the position of the touchscreen;
    superimposing the icon onto the display content of the touchscreen to obtain screen-sharing touch and display content, the screen-sharing touch and display content comprising the display content of the touchscreen and the icon located at the detected position; and
    sending the screen-sharing touch and display content to a screen-sharing display device for display, wherein the touch operation that is performed on the touchscreen at the detected position and that is not observable on the screen-sharing display device is displayed on the screen-sharing display device by displaying the icon on the screen-sharing display device.

8. The method according to claim 7, further comprising displaying the screen-sharing touch and display content on the screen-sharing display device.

9. The method according to claim 7, wherein the touch object is not in contact with the touchscreen and the position of the touch object on the touchscreen is a projection position of the touch object on the touchscreen.

10. The method according to claim 7, wherein the touch object is in contact with the touchscreen and the position of the touch object on the touchscreen is a contact position of the touch object on the touchscreen.

11. The method according to claim 7, further comprising, after superimposing the icon onto the display content of the touchscreen to obtain the screen-sharing touch and display content, updating previously stored screen-sharing touch and display content of the touchscreen according to the screen-sharing touch and display content.

12. The method according to claim 7, wherein detecting the position of the touch object on the touchscreen comprises starting the device having the touch function to enter a screen-sharing mode, and starting detection of the position of the touch object on the touchscreen after the device having the touch function enters the screen-sharing mode.

13. The method according to claim 8, wherein detecting the position of the touch object on the touchscreen comprises starting the device having the touch function to enter a screen-sharing mode, and starting detection of the position of the touch object on the touchscreen after the device having the touch function enters the screen-sharing mode.

14. The method according to claim 9, wherein detecting the position of the touch object on the touchscreen comprises starting the device having the touch function to enter a screen-sharing mode, and starting detection of the position of the touch object on the touchscreen after the device having the touch function enters the screen-sharing mode.

15. The method according to claim 10, wherein detecting the position of the touch object on the touchscreen comprises starting the device having the touch function to enter a screen-sharing mode, and starting detection of the position of the touch object on the touchscreen after the device having the touch function enters the screen-sharing mode.

16. The method according to claim 11, wherein detecting the position of the touch object on the touchscreen comprises starting the device having the touch function to enter a screen-sharing mode, and starting detection of the position of the touch object on the touchscreen after the device having the touch function enters the screen-sharing mode.

17. A screen-sharing display system, comprising:
a device having a touch function; and
a screen-sharing display device functionally connected to the device having the touch function;
wherein the device having the touch function is configured to detect a position of a touch object performing a touch operation at the position on a touchscreen, to generate an icon corresponding to the position of the touch object based on the detected position of the touch object on the touchscreen, the icon comprising information about the detected position of the touch object and indicating the touch operation performed at the detected position on the touchscreen, to superimpose the icon onto display content of the touchscreen to obtain screen-sharing touch and display content, the screen-sharing touch and display content comprising the display content of the touchscreen and the icon located at the detected position, and to send the screen-sharing touch and display content to the screen-sharing display device; and
wherein the screen-sharing display device is configured to receive the screen-sharing touch and display content sent by the device having the touch function and to locally display the screen-sharing touch and display content comprising the icon, wherein the touch operation that is not observable on the screen-sharing display device is able to be displayed on the screen-sharing display device through displaying the icon on the screen-sharing display device.

18. The screen-sharing display system according to claim 17, wherein the device having the touch function is further configured to discover the screen-sharing display device in a communication network, and to start detecting the position of the touch object on the touchscreen after entering a screen-sharing mode.

* * * * *